United States Patent [19]

Wadsworth et al.

[11] 4,115,221

[45] Sep. 19, 1978

[54] ACID FERRIC SULFATE LEACHING OF COPPER SULFIDE CONCENTRATES

[76] Inventors: Milton E. Wadsworth, 3437 S. 13th E.; Jan D. Miller, 1886 Atkin Ave., both of Salt Lake City, Utah 84106; John A. Herbst, 640 Parkview, Park City, Utah 84060; John L. Kolbe, Clarksville, Md. 21029; Howard Wayne Hayden, Columbia, Md. 21043

[21] Appl. No.: 772,944

[22] Filed: Feb. 28, 1977

[51] Int. Cl.$^2$ .............................................. C25C 1/12
[52] U.S. Cl. ..................................... 204/108; 204/106
[58] Field of Search ................................ 204/108, 106

[56] References Cited

U.S. PATENT DOCUMENTS

| | | | |
|---|---|---|---|
| 1,296,523 | 3/1919 | Irving | 204/108 |
| 1,480,059 | 1/1924 | Greenawalt | 204/108 |
| 1,489,121 | 4/1924 | Greenawalt | 204/108 |
| 1,514,153 | 11/1924 | Greenawalt | 204/108 |
| 3,697,400 | 10/1972 | Pang | 204/106 |

*Primary Examiner*—T. M. Tufariello
*Attorney, Agent, or Firm*—K. S. Cornaby

[57] ABSTRACT

A process for hydrometallurgically recovering copper from concentrates of chalcopyrite and other sulfide and mixed sulfide ores utilizes the pretreatment step of fine grinding of the concentrates coupled with subsequent leaching steps. As a pretreatment for the copper-containing concentrates, the concentrates are ground, preferrably with an attritor-type grinding device, to reduce the particle size of the copper bearing concentrate to one micron or less in size. The finely ground copper concentrate is then leached in an acidified ferric sulfate solution to recover the copper contained therein. Following the leching step, a solid-liquid separation is effected. Elemental sulfur may be recovered, and iron removal is achieved by crystallization of iron salts. Ferrous ion is then oxidized to ferric ion for recycling to the leaching step.

9 Claims, No Drawings

ACID FERRIC SULFATE LEACHING OF COPPER SULFIDE CONCENTRATES

BACKGROUND OF THE INVENTION

This invention relates to the field of acid ferric sulfate leaching of copper sulfide concentrates.

Under certain circumstances, hydrometallurgical processing of copper sulfide concentrates offers significant technological advantages and capital cost savings over conventional smelting technology, including pollution control systems. Conventional hydrometallurgical and other proposed processes require the addition of reactants, other than the copper concentrates, such as chlorides, ammonia, and nitrates, coupled with the recycling and disposal of these components, which adds further complexity to the process.

Contrary to the conventional hydrometallurgical copper sulfide concentrate processes known in the art, the process of this invention includes an acid ferric sulfate leach which has not been heretofore practical due to the slow reaction kinetics which have been encountered in the leaching step. By way of example, the leaching reaction for all copper sulfide concentrates results in the formation of a tenacious elemental sulfur product. The reaction equation for chalcopyrite is as follows:

$$CuFeS_2 + 4Fe^{+3} \rightarrow Cu^{++} + 5Fe^{++} + 2S°$$

The resulting nonporous sulfur product layer surrounding each particle of the copper concentrate acts to block the reaction which, as a result, severely limits the amount of copper which can be extracted from the concentrate.

Previous attempts have been made to hydrometallurgically process copper sulfide ores, such as chalcopyrite, by pretreating the copper sulfide concentrates by fine grinding the concentrates prior to leaching. West German Pat. No. 2,061,652, published in Germany on July 6, 1972 by Johannes Gerlach, et al. disclosed the use of a fine grinding mechanism for pretreatment of the copper sulfide concentrates. However, the Gerlach et al. patent required that the particles be shattered by sudden impact to impart lattice deformations which significantly alters the crystalline structure of the particles. The patentees in the German patent incorrectly assumed that the presence of excess energy in the particles would be responsible for enhanced leaching of the sulfide concentrates.

Accordingly, it is an objective of this invention to provide a process for leaching copper sulfide bearing materials employing acidified ferric sulfate solutions.

It is further objective of this invention to employ a pretreatment step of fine grinding the copper sulfide particles.

It is also an objective to provide a process for leaching copper sulfide concentrates without the necessity of adding additional components such as nitrates, chlorides, and the like.

SUMMARY OF THE INVENTION

The present invention provides a process for the acidic ferric sulfate leaching of copper sulfide bearing materials. The copper sulfide bearing concentrates or other materials are first pretreated by fine grinding the concentrate particles to a size of one micron or less. Conventional ball mills and the like are not satisfactory for accomplishing this fine grinding step. In the subsequent steps of the process, it has been found that the extremely small particle size of the concentrate reacts completely to extract the copper contained therein without the inhibiting effect of the tenacious elemental sulfur layer around each concentrate particle which in previous processes has prevented the reaction from going to completion and thereby oxidizing all of the copper contained in the concentrate particles. Following the step of fine grinding the concentrate particles to a size of one micron or smaller, the finely ground concentrate is leached in an acidic solution in the presence of ferric ion for a sufficient period of time to leach substantially all of the copper from the concentrate. Since elemental sulfur is formed, the next step is that of a solid-liquid separation, for example by a flotation technique, to separate the pregnant leach solution containing the copper ions from any unreacted concentrate and elemental sulfur. The residue from the separation can then be treated by a steam distillation technique to recover high purity elemental sulfur. Any remaining concentrate can be recycled back to the leaching step after recovery of whatever precious metals may have been contained in the concentrate.

The pregnant leach solution is then treated for removal of the iron by the crystallization of iron salts. The pregnant leach solutions are next subjected to electrolysis to regenerate ferric ion using, for example, a diaphram cell with the resulting deposition of elemental copper which can then be further treated for purification by known means. The resulting ferric sulfate solution is returned to the leaching step for further leaching of additional amounts of copper sulfide concentrate. In this manner, the acidic ferric sulfate leach process is a closed system which does not require the introduction of other ions from extraneous sources.

Alternatively, the pregnant leach solution following the solid-liquid separation step can be treated by gaseous reduction or conventional solvent extraction techniques coupled with electrolysis to produce elemental copper which can be further refined by known methods. The remaining solution containing mainly ferrous and sulfate ions can then be oxidized, for example by catalytic means, to regenerate the ferric sulfate leach solution. Such ferric sulfate leach solution is then introduced back into the leaching step to be available for further oxidation of copper bearing sulfide materials. Again, this comprises a closed system without the necessity of introducing oxidants from extraneous sources. It is understood, of course, that in either alternative embodiment, the iron salts which are precipitated out of solution could be removed and ferric sulfate from other sources could be introduced in the leaching solution.

DETAILED DESCRIPTION OF PREFERRED EMBODIMENTS

The first step in the practicing of the process comprises the step of fine grinding the copper sulfide bearing material, such as chalcopyrite, with an appropriate fine grinding mechanism to a particle size of one micron or less. The so called attritor has been found to be ideal for this purpose. In one embodiment of this attritor, 15.25 kilograms of stainless steel balls having a size of 0.25 inch in diameter were fluidized at 340 rpm in a one gallon tank employing a three horse-power motor. The material load was fixed at 1.6 kilograms with a pulp density of 60% solids. The duration of the fine grinding period will be dependent upon the speed and number of steel balls and upon the volume of concentrate passed through the fine grinding process or apparatus. Also, the size of the concentrate particles as they are introduced into the fine grinding mechanism will also have a bearing upon the duration of the fine grinding step.

In the next step, the finely ground concentrate particles are leached preferably at elevated temperatures of approximately 90° C in an acidic medium in the presence of ferric sulfate ions. The overall reaction for the process proceeds as shown in the following equation:

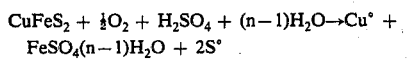

The major portion of the leaching reaction is due to the following reaction which takes place to produce cupric and ferrous ions together with elemental sulfur:

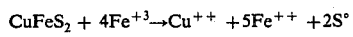

The leaching is carried out for a sufficient period of time to oxidize substantially all of the copper sulfide and release cupric ions into solution.

The next step involves the separation of the pregnant leach solution from any solids remaining in the reaction, including elemental sulfur and unreacted concentrate particles. At this point the sulfur may be removed by known means, such as a steam distillation technique, and any remaining concentrate and particulate material can be treated to recover precious metals before being recycled to the leaching step.

The pregnant leach solution is next treated for iron removal for example by precipitating the ferrous sulfate salt by known means. The mixture of remaining ferrous sulfate and copper containing solution is electrolized, preferably in a diaphram cell to produce elemental copper for further refining and partial oxidation of ferrous ion. The remaining ferrous iron is oxidized externally, for example by catalytic means for return to the leaching step and use with additional amounts of finely ground concentrate.

In a second preferred embodiment, the overall reaction of the leaching and copper removal steps following the fine grinding step proceeds as shown in the following equation:

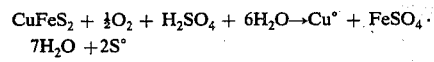

The sequence of steps according to this embodiment proceeds the same as in the earlier described embodiment up to the solid liquid separation. Removal of elemental sulfur and recycling of the unreacted concentrate particles can be effected as in the earlier embodiment. In this embodiment, the pregnant leach solution is subjected to a conventional solvent extraction process to isolate the copper ions which are then reduced to elemental copper by electrolysis. The remaining solution containing the ferrous ions is processed in a subsequent step to precipitate the ferrous ion as ferrous sulfate in the presence of water. The ferrous sulfate crystals can either be removed at this point from the reaction, or can be moved to a subsequent step at which sulfuric acid and oxygen are introduced to oxidize the ferrous ion to ferric. The ferric ion is then recycled to the leaching step and is available for use with further amounts of finely ground copper concentrate particles. In this manner, the second embodiment is also a closed system and can be operated without the introduction of extraneous catalytic agents, such as nitrates and the like, which must then be removed from or recycled in the system.

Test data utilizing chalcopyrite as the copper sulfide concentrate support the concept that the rate of reaction of the chalcopyrite in an acidic ferric sulfate leaching process of the type described in this application is for all practical purposes controlled by diffusion through the reaction product layer, that is the elemental sulfur layer which surrounds each individual concentrate particle. It appears that the ferric ion is in fact the diffusing species of ion through the reaction product layer in reaching the copper present in the concentrate particle. It was found that greater than 90% copper extraction from the chalcopyrite was achieved after a reaction time of three hours. Again, particle size was smaller than one micron and reaction temperature in the leaching step was at approximately 90° C. In contrast it was found that conventionally ground chalcopyrite concentrate resulted in only 10% copper removal in a three hour leach, and never exceeded 50% under the most optimum conditions.

The leaching tests were done in one liter, baffled, cylindrical glass reactors with clamp-held lids containing four fitted openings. A thermometer, solution sampler, condenser, and stirrer were placed into the reactor through these openings. The system was completely sealed in order to reduce evaporation losses during leaching. The reactors were submerged in circulating oil baths which maintained a constant temperature, $+0.5°$ C. Distilled water and reagent grade chemicals were used to prepare 1000 ml. of the desired leaching solutions. Solution samples of 5 ml. were withdrawn at timed intervals and analyzed for copper concentration with a Perkin-Elmer Model 303 Atomic Absorption Spectrophotometer. Ferrous iron was analyzed by titration with standardized ceric solutions using ferrion as an indicator in order to determine the reaction stoichiometry (19). Solid products were analyzed in a standard soxhlet apparatus using carbon disulfide to determine the amount of sulfur during the leaching reaction. Also, solid samples were carefully analyzed and examined both before and after grinding, and before and after leaching, with an x-ray diffractometer and a cambridge stereoscan scanning electron microscope.

It is understood that the particular forms of the invention described herein are preferred embodiments. Various changes in the process may be made without departing from the scope of the invention as defined in the attached claims.

We claim:

1. A process for removing copper from copper sulfide bearing materials comprising the steps of:
   fine-grinding copper sulfide-bearing materials to a particle size of at most one micron;
   leaching said finely-ground copper sulfide-bearing material in an acidic solution containing a stoichiometric amount of ferric ions to oxidize the copper ions contained in the copper sulfide-bearing material and form a pregnant leach solution containing said copper ions and ferrous ions;
   separating said copper ion-bearing pregnant leach solution from any remaining solid materials;
   crystallizing iron salts in the pregnant leach solution;
   electrolyzing the pregnant leach solution and ferrous sulfate to produce elemental copper and ferrous ion in solution; and introducing oxygen and sulfuric acid to the ferrous ion-bearing solution to oxidize the ferrous to ferric ions.

2. A process as set forth in claim 1, wherein said ferric ions produced by oxidizing ferrous ions are recycled to the leaching step for a continuous, closed system.

3. A process as set forth in claim 1, wherein elemental sulfur formed in said leaching step is removed from said pregnant leach solution with other solids at the liquid-solid separation step.

4. A process as set forth in claim 1, wherein said nonreacted copper sulfide-bearing material separated from said pregnant leach solution is recycled to said leaching step.

5. A process as set forth in claim 1, wherein said leaching step is carried out at a temperature of approximately 90° C.

6. A process as set forth in claim 1, wherein ferrous ions in the remaining solution are oxidized to ferric ions and recycled into the leaching step to form a closed, continuous system.

7. A process as set forth in claim 6, wherein said ferrous ions are oxidized to ferric ions in the presence of oxygen gas and sulfuric acid.

8. A process as set forth in claim 1, wherein said leaching step is carried out at approximately 90° C.

9. A process as set forth in claim 1, wherein dissolved iron in the remaining solution is precipitated as an iron salt.

* * * * *